March 10, 1970  D. B. BADGLEY  3,499,527
METHOD AND APPARATUS FOR SELECTIVELY SEPARATING MEAT PRODUCTS
Filed Oct. 5, 1967  3 Sheets-Sheet 1

DURWARD B. BADGLEY
INVENTOR.

BY *E T McCabe*

ATTORNEY.

DURWARD B. BADGLEY
INVENTOR.

United States Patent Office 3,499,527
Patented Mar. 10, 1970

3,499,527
METHOD AND APPARATUS FOR SELECTIVELY SEPARATING MEAT PRODUCTS
Durward B. Badgley, Chicago, Ill., assignor to Swift & Company, Chicago, Ill., a corporation of Delaware
Filed Oct. 5, 1967, Ser. No. 673,062
Int. Cl. B07c *5/342;* G01b *11/28;* G01j *3/10*
U.S. Cl. 209—111.6   8 Claims

ABSTRACT OF THE DISCLOSURE

Meat products displaying surface areas of lean and fat are segregated in accordance with a desired ratio of lean to fat by projecting green light upon the surface areas and detecting the intensity of green light reflected therefrom.

---

The present invention relates to a new and improved method and apparatus for providing quality assurance of a desired lean to fat ratio displayed in meat products. More particularly, it deals with a new and improved method wherein a new and improved light sensing apparatus is employed to select meat products based on a ratio of lean meat to fat displayed in the meat product.

In the production of meat products, it is often a requirement to make certain tests for quality control. One such test is to select meat products on the basis of the relative amount of lean meat and fat displayed by the meat product. It would, therefore, be highly advantageous to have a reliable method and means to make this selection on the basis of the ratio of lean meat to fat displayed in a meat product so as to assign a proper quality representation to said meat products.

A problem in the production of bacon, which led to the embodiments of the present method and apparatus herein disclosed, was a necessary selection of bacon products on the basis of the lean meat displayed therein for the purpose of quality assurance of the product. Excessively fatty bacon products would not be acceptable to consumers and such a product would have an undesirable effect on the household consumer market. Accordingly, it was recognized that it would be highly desirable to develop a uniform method and means for performing a quality analysis as a control so that bacon products appearing to have excessive fat content could be selectively separated from products having a desired ratio of lean meat to fat.

It is, therefore, an object of the present invention to provide a new and improved method and apparatus for selecting meat products on the basis of the ratio of lean meat to fat displayed therein.

A further object is to provide a new and improved method and apparatus for performing quality analysis of meat products so that products displaying excessive fat can be separated from products displaying a desired ratio of lean meat to fat.

A still further object is to provide a new and improved method and apparatus for performing quality analysis of bacon products so that products displaying excessive fat content can be separated from products displaying a desired ratio of lean meat to fat.

Fundamentally, the method of the present invention involves projecting green light on the surface of a meat product. The green light causes the lean meat to appear black and this surface will, therefore, reflect no light, while causing the fat to appear green and reflect green light. Hence, a light sensitive element is employed that is sensitive to green to receive the reflected green light; and the intensity of green light received by the light sensitive element provides a means for selecting products based on the relative amount of lean meat and fat present therein. In accordance with the percentage of lean meat present as indicated by the intensity of the green light detected by the light sensitive element, the meat products may be selectively segregated.

A basic apparatus for carrying out the above method comprises a means for projecting green light on the surface of a meat product and a light sensing means to receive the green light reflected from the meat surface. A control means is connected to the light sensing means in a manner such that it will indicate meat products to be separated or passed according to the intensity of green light detected by the light sensing means.

Further objects and advantages of the present invention will become apparent upon reading the following specification in conjunction with the drawings, wherein.

Figure 1:
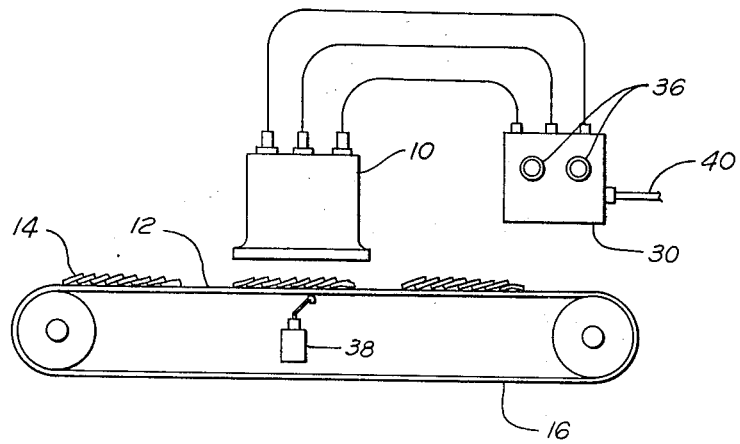
FIGURE 1 is a schematic front view of the device of the present invention.

In practicing the method of the present invention, it is contemplated that selection of meat products on the basis of the ratio of lean meat to fat displayed therein may be obtainable for a wide variety of meat products, both packaged and unpackaged. With specific reference to analyzing bacon products, as previously outlined, selection of product based on the percentage of lean meat displayed therein may be made prior to packaging the product or after packaging through a window in the package. Indeed, since the instant method and apparatus allows for effectively analyzing the overall appearance of a relatively large surface area, which has not been possible heretofore, the instant method may be employed to select meat products on the basis of the ratio of lean meat to fat displayed in a transparent package showing all or a substantial portion of the product.

In operation, the instant method comprises positioning a meat product, particularly a processed, shingled bacon product, packaged or unpackaged, on a surface and projecting an area of green light evenly on the surface of the meat product. The lean red meat portion will absorb this green light and appear black, thus reflecting no light. But, under the green light, the white fat portion appears green and this green light is reflected from the meat surface and will activate known light sensing means such as a photocell. Based on the intensity of said green light reflected from the meat surface and received by said light sensing means, meat products can be selected as possessing the requisite percentage of lean meat or rejected as having excessive fat content. If the intensity of green light sensed by the sensing means is higher than a predetermined level, then a signal means will be activated and will indicate that the product should be rejected as being excessively fatty. But, if the intensity of green light sensed is below this predetermined level, said signal means will indicate that the product should be passed as having an acceptable ratio of lean meat to fat displayed therein. In this manner, meat products may be selectively segregated on the basis of the ratio of lean meat to fat displayed therein.

A preferred embodiment of an apparatus for carrying out the foregoing method is shown in FIGURES 1–5. In this apparatus, light projecting elements and light sensing elements are mounted in a frame generally 10. The frame is positioned above a surface generally 12 upon which meat products 14 to be analyzed are placed. Preferably, the surface 12 comprises a conveyor means such as an endless conveyor 16, illustrated, whereby meat products may be automatically introduced for analysis. The conveyor means may be of the belt type and is preferably black so that the surface will not provide extraneous light reflection.

Figure 2:
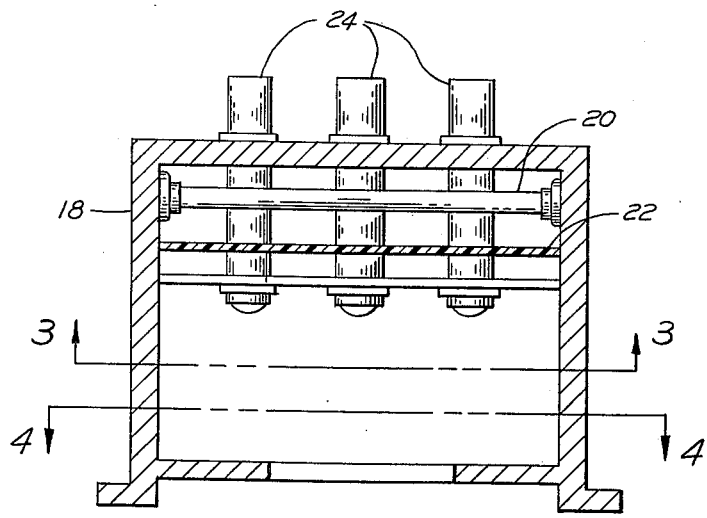
FIGURE 2 is an enlarged sectional elevation view of a portion of the apparatus shown in FIGURE 1, comprising a sensing means.
Figure 3:
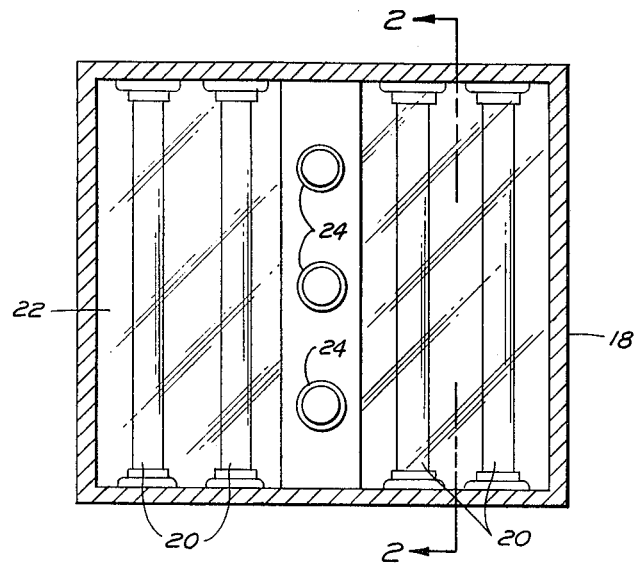
FIGURE 3 is a sectional plan view taken at line 3—3 of the apparatus shown in FIGURE 2.
Figure 4:
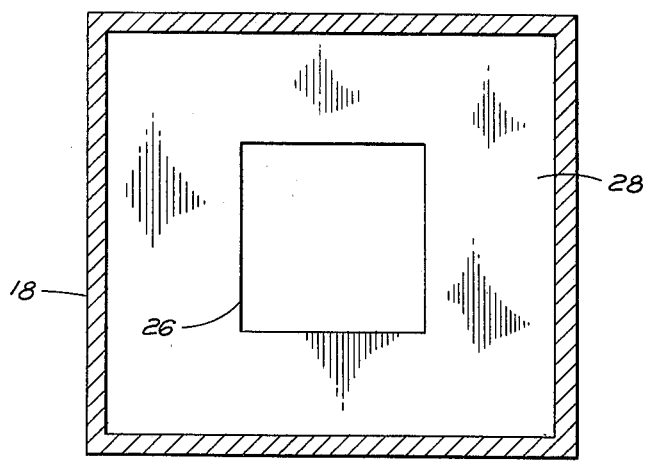
FIGURE 4 is a sectional plan view taken at line 4—4 of the apparatus means shown in FIGURE 2.

The frame 10 comprising a scanning casing 18 houses a light source such as four parallel and evenly spaced fluorescent lamps or tubes 20, a green light filter means generally 22, and three light sensing means such as photoelectric or light sensitive cells generally 24, as may be best seen in FIGURES 2-4. The green light filter means 22 is mounted in the frame 10 in a position between the light source 20 and the base of the frame; and the light sensing means is mounted so as to be positioned in the frame between the green filter means 22 and the base of the frame. The base of the frame, which includes a viewing aperture 26 set in a blackened interior surface 28 is in turn positioned above the surface 12 upon which meat products 14 to be analyzed are placed.

Figure 5:
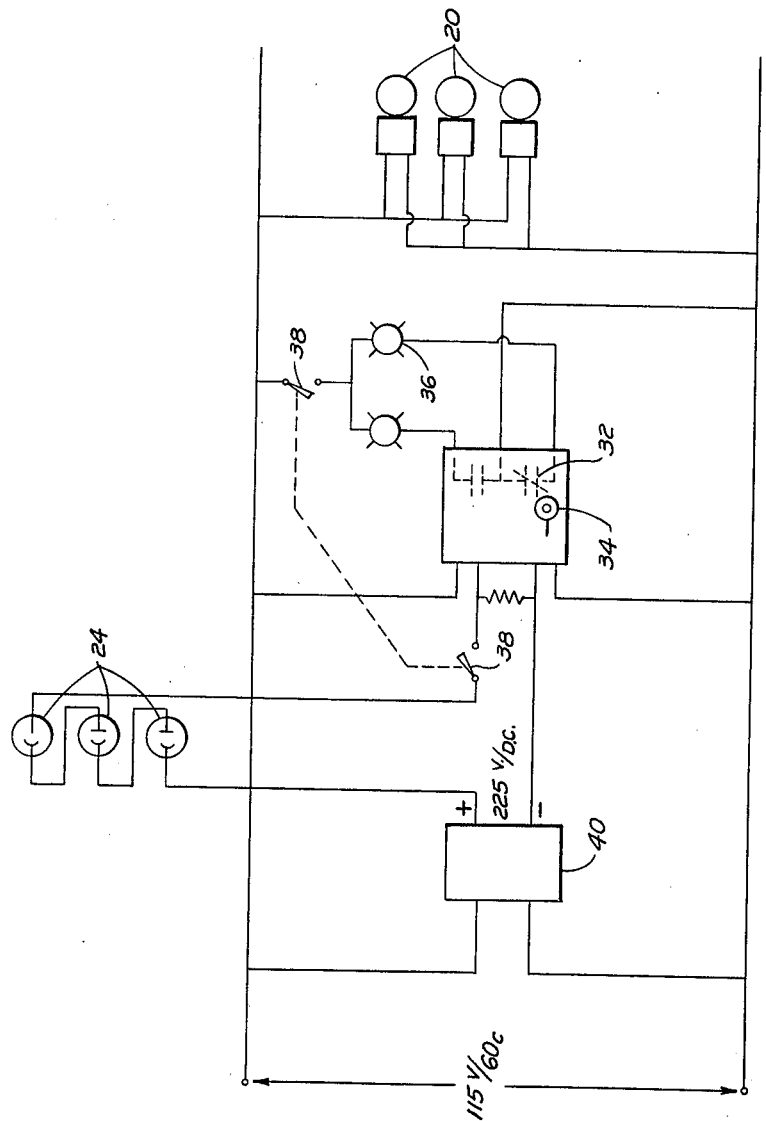
FIGURE 5 is a schematic wiring diagram showing an electrical system for operating the device of FIGURE 1.

The light sensing means 24 is connected to a control means generally 30 as shown in FIGURE 1. The control means comprises a current sensitive relay element 32 and a current set point or range potentiometer 34 and a signal means such as signal lights 36 as shown in FIGURE 5. In operation, when a meat product 14 is in position beneath the viewing aperture 26 in the frame 10, a pair of microswitches 38, which are interconnected in a manner such that when one closes the other will also close, are closed setting up a circuit through which current from a power source 40 can flow. The rate of current flow through the circuit is directly related to the intensity of green light received by the light sensing means 24 since the resistance of the photocells comprising the sensing means 24 is inversely related to the intensity of light received thereby. Thus, when the rate of current flow through the circuit to the current sensitive element 32 of the control means 30 is greater than that provided for by the setting of the potentiometer 34 in the control means 30, such setting being predetermined by prior analysis of acceptable meat products, then the signal means 36 will indicate that the meat product being analyzed should be rejected due to excessive fat content of the meat product. If the current flow is below the potentiometer 34 setting, the signal means 36 will so indicate and the meat product will be passed as having the requisite percentage of lean meat therein.

Obviously many modifications and variations of the invention as hereinbefore set forth may be made without departing from the spirit and scope thereof.

I claim:
1. A method for selecting meat products in accordance with the percentage of lean meat displayed therein comprising: projecting an area of green light evenly on the surface of a meat product whereby lean red portions will absorb said light and appear black whereas the white fat portions will reflect said light; sensing said green light reflected from the surface of said meat product; and selectively segregating said meat product in accordance with the intensity of said reflected green light.

2. The method of claim 1 wherein a series of drafts of shingled bacon slices are processed and segregated into two groups in accordance with the sensing of reflected light to be above or below a selected intensity.

3. The method of claim 1 wherein the area of green light is projected upon the surface of a meat product by passing light from a plurality of parallel fluorescent tubes through a green light filter held between said tubes and said product.

4. An apparatus for selectively segregating meat producs in accordance with the percentage of lean meat displayed therein comprising: means for projecting green light evenly on the surface of a meat product; a light sensing means to receive said green light reflected from said meat surface, said light sensing means being located centrally above said surface and beneath said means for projecting green light; and means to indicate the meat products to be segregated in accordance with the intensity of said green light reflected from said meat surface.

5. The apparatus of claim 4 wherein the light sensing means comprises three photoelectric cells.

6. The apparatus of claim 4 wherein the means for projecting green light on the surface of a meat product comprises a light source and a green filter, said green filter being positioned between said light source and said meat product.

7. The apparatus of claim 4 comprising: a conveying means to bring said meat products past said area of green light; and a control means to indicate appropriate segregation meat products according to the intensity of said green light detected by said light sensing means.

8. The apparatus of claim 4 wherein the light source is four parallel and evenly spaced fluorescent tubes.

References Cited

UNITED STATES PATENTS

| | | | |
|---|---|---|---|
| 2,165,054 | 7/1939 | Johnson | 356—186 |
| 3,154,625 | 10/1964 | Kail | 356—157 |
| 3,396,280 | 8/1968 | Knudsen | 250—223 |

RICHARD A. SCHACHER, Primary Examiner

U.S. Cl. X.R.

356—157, 190